Sept. 1, 1931.  C. O. J. MONTELIUS  1,821,523
ROTARY PUMP, COMPRESSOR, OR MEASURING DEVICE
Filed Jan. 9, 1930
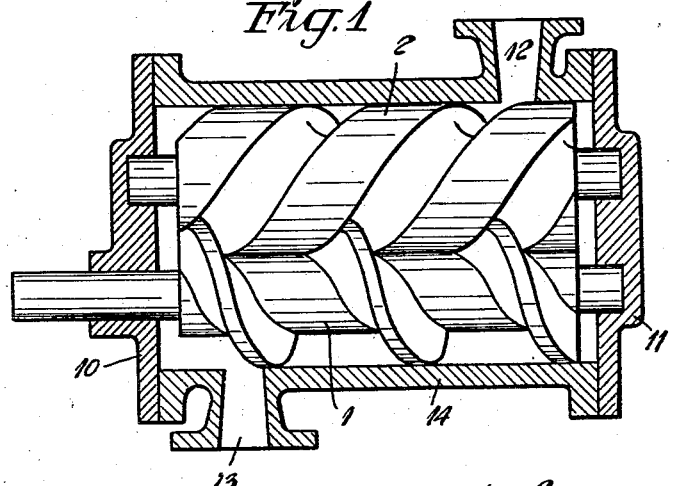
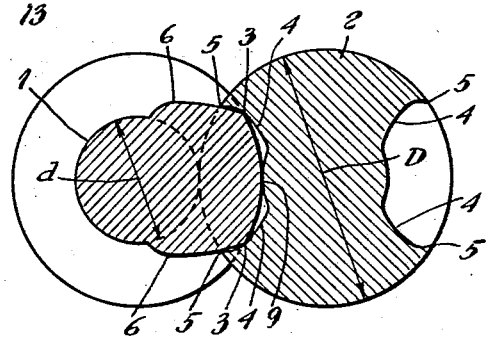
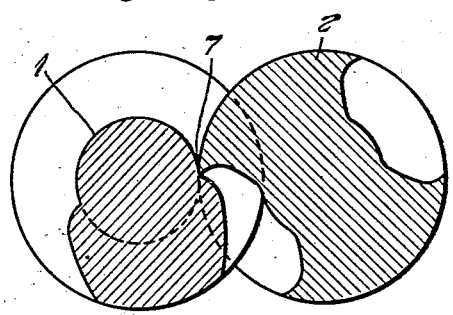
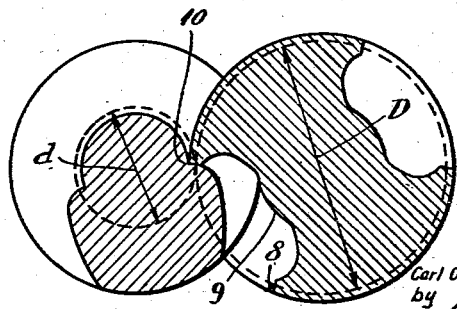
INVENTOR
Carl Oscar Josef MONTELIUS Patented Sept. 1, 1931

1,821,523

UNITED STATES PATENT OFFICE

CARL OSCAR JOSEF MONTELIUS, OF STOCKHOLM, SWEDEN

ROTARY PUMP, COMPRESSOR, OR MEASURING DEVICE

Application filed January 9, 1930, Serial No. 419,583, and in Germany January 16, 1929.

This invention relates to rotary pumps, compressors, motors or meters, and I describe a device consisting of two or more rotary screws with intermeshing threads and surrounded by a casing provided with an inlet and an outlet. The intermeshing screws of every pair have opposite pitch and revolve in opposite directions. The screws are so shaped as to fit to each other and to the casing. When the screws are rotated, a quantity of fluid, a liquid or a gas, enclosed by the same will be discharged and, vice versa, when the fluid is being driven through the device, the screws are caused to rotate. Thus the arrangement may be used either as a pump, compressor, motor or a measuring device.

The invention has for its object to accomplish a better cooperation of the screws and at the same time to provide a more simple arrangement by shaping the screws in a special manner.

The invention consists substantially in the feature that in each pair of cooperating screws one screw is made with convex and the other screw with concave helical surfaces, in order to obtain a fluid-tight arrangement, the screws further being so arranged that during their rotation the outer edge of the one screw, preferably the concave one, will roll on the corresponding portion of the root of the thread of the second screw, preferably the convex one, said outer edge being then preferably shaped as a helical-gear surface.

The invention is illustrated in the accompanying drawings, where Fig. 1 shows a longitudinal sectional elevation of an embodiment of my invention, while Figs. 2 and 4 are cross-sections of screws according to the invention.

Fig. 1 shows a single-thread screw 1 having convex helical surfaces, and a double-thread screw 2 provided with concave helical surfaces. These screws 1 and 2 are tightly surrounded by a casing 14 provided with covers 10 and 11, and with an inlet 12 and an outlet 13 respectively.

Fig. 2 is a cross-section of the screws 1 and 2 in a symmetrical position where the edges 3 of the single-thread convex screw 1 fit to the flanges 4 of the double-thread concave screw 2, while, similarly, the edges 5 of the double-thread screw 2 fit to the flanges 6 of the single-thread screw. The shapes of these flanges 4 and 6 are mathematically defined, so that the corresponding edges 3 and 5 of the cooperating screws shall always fit to said flanges when the screws are rotated. Within certain limits it is possible arbitrarily to choose the dimensions. It is not possible, however, to fix a diameter D at the edge 5 of the screw 2 which is more than twice the diameter $d$ at the root of the thread of the screw 1. In this extreme case, where $D=2d$, the peripheral speed of the two helical surfaces is evidently the same at the point of contact 7, Fig. 3. It is thus possible to manufacture the screws so that they will touch one another at this point, that is to say, in such a manner that they act as spiral-cut gears which run each other without sliding. The contact pressure between the screws will thus occur principally where the edge 7 of the screw 2, Fig. 3, bears against the root of the thread of the screw 1 in the axial plane.

Fig. 4 shows a far superior arrangement. It is true that the shape illustrated in Figs. 2 and 3 from a mathematical point of view is correct, but it is nevertheless obvious that a small wear of the edge 5, Figs. 2 and 3, which mechanically is very frail, will shift the contact from the point 7, Fig. 3, of this edge to other points of the edge 3 bearing against the surface 4 and of the edge 5 bearing against the surface 6 (Fig. 2). As a consequence the power will be transmitted under very unfavorable conditions. The shape of the screws illustrated in Fig. 4 differs from the form according to Figs. 2 and 3, the sharp edges 5, Fig. 2, and 7, Fig. 3, having been developed into narrow helical-gear surfaces 10, Fig. 4. Also in this case, the contact pressure appears in the proximity of a position corresponding to the edge 7, Fig. 3, but the contact pressure acts without sliding, the surfaces rolling on one another in the manner of intermeshing spiral-gear teeth. In Fig. 4 the pitch circles are shown in dotted lines, the corresponding diameters being $d$ and $D$, the latter of which is equal to $2d$. Inasmuch as the screws may be so dimensioned that the mechanical forces to be transmitted are immaterial, the width of the contact surface may be kept small, and the difference from the mathematically correct shape, Figs. 2 and 3, does not impair the fluid-tight disposition.

The advantages of the arrangement are considerable. The helical surfaces may be formed in such a manner that rolling takes place without sliding-friction, while the tightening effect will nevertheless remain perfect. The parts of the screws rolling on one another operate as a toothed gearing forming a self-contained unit with the screws. Special coupling of the screws by means of toothed wheels or the like is thus rendered superfluous.

The arrangement may be devised on the same lines also where more than two screws cooperate.

What I claim is:—

1. In a rotary pump, compressor, motor or meter, at least a pair of intermeshing rotary screws, a casing surrounding said screws and fitting to the outside perimeter thereof, the helical side surfaces of the thread of one screw being convex and those of the other intermeshing screw concave and the outer edge of the thread of one of the screws being shaped as a rolling surface bearing against the root of the thread of the intermeshing screw.

2. In a rotary pump, compressor, motor or meter, at least a pair of intermeshing rotary screws, a casing surrounding said screws and fitting to the outside perimeter thereof, the helical side surface of the thread of one screw being convex and those of the other intermeshing screw concave and the outer edge of the thread of the screw having concave helical surfaces being shaped as a rolling surface bearing against the root of the thread of the intermeshing screw having convex helical surfaces.

3. In a rotary pump, compressor, motor or meter, at least a pair of intermeshing rotary screws, a casing surrounding said screws and fitting to the outside perimeter thereof, the helical side surfaces of the thread of one screw being convex and those of the other intermeshing screw concave, the outer edge of the thread of one of the screws being shaped as a rolling surface bearing against the root of the thread of the intermeshing screw and the direct transmission of power from one screw to another taking place through contact between the said rolling surface at the edge of the thread of the one screw and the root of the thread of the intermeshing screw without the use of any transmission by gear wheels or the like.

4. In a rotary pump, compressor, motor or meter, a plurality of pairs of intermeshing rotary screws, a casing surrounding said screws and fitting to the outside perimeter thereof, the helical side surfaces of the threads of the screws being so formed that in every pair of intermeshing screws the said surfaces of one screw are convex and those of the other screw concave, the outer edge of the thread of each screw having concave helical surfaces being shaped as a rolling surface bearing against the root of the thread of the intermeshing screw having convex helical surfaces and the direct transmission of power between the two screws of each pair taking place through contact between the said rolling surface at the edge of the thread of said former screw and the root of the thread of said second screw without the use of any transmission by gear wheels or the like.

CARL OSCAR JOSEF MONTELIUS.